US007965315B2

(12) United States Patent
Jang

(10) Patent No.: US 7,965,315 B2
(45) Date of Patent: Jun. 21, 2011

(54) DISPLAY DEVICE CAPABLE OF REDUCING AFTERIMAGE AND AFTERIMAGE REDUCTION METHOD THEREOF

(75) Inventor: Seung-ho Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1318 days.

(21) Appl. No.: 11/530,515

(22) Filed: Sep. 11, 2006

(65) Prior Publication Data

US 2007/0177058 A1 Aug. 2, 2007

(30) Foreign Application Priority Data

Jan. 27, 2006 (KR) ........................ 10-2006-0008813

(51) Int. Cl.
*H04N 3/20* (2006.01)
*G01B 13/00* (2006.01)

(52) U.S. Cl. ........................................ 348/173; 715/867

(58) Field of Classification Search .................. 348/173, 348/377, 564, 553, 606, 630, 189; 715/867; 345/618, 626, 628, 638–641

See application file for complete search history.

(56) References Cited

U.S. PATENT DOCUMENTS 4,722,005 A * 1/1988 Ledenbach .................. 348/173
5,821,917 A * 10/1998 Cappels ........................ 345/589
6,433,839 B1 * 8/2002 Siefken ......................... 348/700
6,486,900 B1 * 11/2002 Shen et al. .................... 715/867
6,891,564 B2 * 5/2005 Fujimori et al. .............. 348/173
7,102,694 B2 * 9/2006 Jang ............................. 348/607
2003/0071769 A1 4/2003 Sullivan et al.
2004/0051705 A1 3/2004 Lee
2004/0165064 A1 * 8/2004 Weitbruch et al. ............ 348/173
2005/0093850 A1 * 5/2005 Mori et al. .................... 345/204
2005/0110871 A1 5/2005 Ida

FOREIGN PATENT DOCUMENTS

EP 1271459 1/2003
JP 08-292740 11/1996
JP 09-50258 2/1997
JP 2000-227775 8/2000
KR 2004-26057 3/2004
KR 2004-26059 3/2004

OTHER PUBLICATIONS

European Search Report dated Feb. 12, 2007 issued in EP 06077088.0.

* cited by examiner

*Primary Examiner* — Victor Kostak
(74) *Attorney, Agent, or Firm* — Stanzione & Kim, LLP

(57) ABSTRACT

A display device capable of reducing afterimage, and an afterimage reduction method used by the display device. One or more afterimage reduction patterns having one or more opaque areas, and/or one or more semi-transparent areas and one or more non-opaque areas are stored in a storage unit. A composition unit outputs a final image composed of a displayed main image and afterimage reduction patterns output from the storage unit. A control unit causes afterimage reduction patterns selected by a user from the storage unit to be input to the composition unit, and a final image in which only pixels corresponding to opaque areas and/or semi-transparent areas in the main image are replaced by color of the opaque areas and/or semi-transparent areas in the afterimage reduction patterns to be output from the composition unit. Accordingly, it is possible to view a received main image while reducing afterimage using images of various patterns for afterimage reduction.

30 Claims, 14 Drawing Sheets

DISPLAY DEVICE CAPABLE OF REDUCING AFTERIMAGE AND AFTERIMAGE REDUCTION METHOD THEREOF

BACKGROUND OF THE INVENTION

1. Field of the Invention

The present general inventive concept relates to a display device capable of reducing afterimage and an afterimage reduction method thereof, and more specifically, to a display device capable of reducing afterimage and an afterimage reduction method thereof that uses images of various patterns and sizes.

2. Description of the Related Art

Demand for flat panel displays has recently increased due to the relatively lightweight and thin size of the flat panel displays compared to display devices with cathode ray tubes. Additionally, large screens for flat panel displays can be produced easily. Currently, liquid crystal displays and plasma display panels are attracting considerable attention.

However, if a flat panel display displays a still image for longer than a predetermined period of time, there is a problem in that the pixels deteriorate, resulting in afterimage. If a still image is displayed for an extended period of time, the specific pixels that make up the still image have a shorter lifespan than other surrounding pixels, and when the still image is replaced by a different image, an afterimage remains displayed on the screen, causing a reduction in image quality. This situation can also apply to a single image frame from a video file. As a result of this lingering effect, a viewer may view an image that is unpleasant or has defects, and in some situations, a significant financial loss may occur due to the cost of poor quality (COPQ).

SUMMARY OF THE INVENTION

The present general inventive concept provides an afterimage reduction technique using images of various patterns and an image reduction method thereof.

The present general inventive concept also provides a display apparatus capable of reducing afterimage and also reducing unpleasantness when viewing a main image by displaying an image used for the afterimage reduction together with the main image.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a display device including a storage unit to store one or more afterimage reduction patterns having one or more non-opaque areas, and/or semi-transparent areas and/or one or more opaque areas, a composition unit to output a final image composed of a main image externally provided from an external source and the afterimage reduction patterns provided from the storage unit, and a control unit to output an afterimage reduction pattern selected from among the afterimage reduction patterns stored in the storage unit to the composition unit and to output the final image from the composition unit to replace only pixels in the main image which correspond to the opaque areas and/or semi-transparent areas in the selected afterimage reduction pattern with a color of the opaque areas.

Each of the stored afterimage reduction patterns may have a predetermined aspect ratio.

A number of pixels of each of the stored afterimage reduction patterns may be greater than a number of pixels of a full screen of a display unit, and a sufficient number of afterimage reduction patterns may be stored in the storage unit so that all of the opaque areas and/or semi-transparent areas can replace each pixel of the main image at least once.

Each of the afterimage reduction patterns may have either a full pattern with the one or more opaque areas distributed uniformly over the entire pattern, or a full pattern with the one or more opaque areas and/or one or more semi-transparent areas distributed in specific areas of the pattern.

The aspect ratio of each of the stored afterimage reduction patterns may be represented by the equation below.

$$\text{aspect ratio}=x:y,\ (\text{if } x=a\ y\neq b, \text{ or if } y=b \text{ then } x\neq a)$$

Here, "a" refers to a horizontal line on the display unit, "b" refers to a vertical line on the display unit, "x" refers to a horizontal line on the afterimage reduction pattern, and "y" refers to a vertical line on the afterimage reduction pattern.

The control unit may compose and display two afterimage reduction patterns intersecting in a cruciform pattern with the main image.

More specifically, in the storage unit the one or more afterimage reduction patterns having the one or more opaque areas and/or one or more semi-transparent areas may be stored together with an initial location value and a display time of each of the opaque areas and/or semi-transparent area. The control unit processes each of the opaque areas in order to repeatedly move the opaque areas and/or semi-transparent areas adaptively up, down, left or right, after displaying each of the opaque areas and/or semi-transparent areas for the set display time at a location corresponding to the initial location value.

Moreover, all areas of the afterimage reduction patterns may be composed of the opaque areas, each of which may have an area of (m×n) (m and n being positive integers). The opaque areas and/or semi-transparent areas may be colored black and/or may be composed of bitmaps.

The display device may further comprise a user input unit to output a request signal to request afterimage reduction such that the control unit activates an afterimage reduction function and controls the composition unit so that the composition unit outputs the final image when the request signal is received by the control unit.

Moreover, if a time during which the main image is displayed on a display unit exceeds a preset standard time, the control unit activates the afterimage reduction function and controls the composition unit so that the composition unit outputs the final image.

The foregoing and/or other aspects of the present general inventive concept are also achieved by providing a display device, including a signal processing unit to receive a main image and to generate a pattern of opaque areas to combine with the main image, and a display unit to display the main image with the pattern of opaque areas and/or semi-transparent areas overlapped therewith.

The foregoing and/or other aspects of the present general inventive concept are also achieved by providing a display device, including a display unit to display a color image that corresponds to a received external signal during a first predetermined time, and an afterimage reduction pattern generation unit to generate a pattern to change colors in one or more areas of the displayed color image during a second predetermined time after the first predetermined time elapses.

The foregoing and/or other aspects of the present general inventive concept are also achieved by providing an afterimage reduction method usable in a display device, the method including displaying a main image, generating a final image by composing the main image with one or more afterimage reduction patterns having one or more opaque areas and/or one or more semi-transparent areas, and/or one or more transparent areas such that pixels in the main image corresponding to the opaque areas and/or semi-transparent areas in the main image are replaced with a color of the opaque areas and/or semi-transparent areas, displaying the final image.

Each of the afterimage reduction patterns may have a predetermined aspect ratio.

A size of each of the afterimage reduction patterns may be greater than a size of a full screen area of a display unit where the main image is displayed. Additionally, a large enough number of the afterimage reduction patterns are stored in a storage unit so that all the opaque areas and/or semi-transparent areas are able to replace all the pixels of the main image at least once.

Each of the afterimage reduction patterns may either be a first pattern type in which the one or more opaque areas and/or semi-transparent areas are distributed uniformly over the entire pattern, or a second pattern type in which the one or more opaque areas and/or one or more semi-transparent areas are distributed in fixed areas on the pattern.

Additionally, both the first pattern type and the second pattern type may be generated to intersect in a cruciform pattern and composed with the main image.

The method may further comprise pre-storing the one or more afterimage reduction patterns having the one or more opaque areas and/or one or more semi-transparent areas together with an initial location value and a display time of the opaque areas and/or semi-transparent areas in a storage unit. Additionally, the generating of the final image may comprise generating the afterimage reduction pattern in which each of the opaque areas is displayed at a location corresponding to the initial location value such that the displaying of the final image may comprise displaying the generated afterimage reduction pattern for the specified display time, and if the display time elapses, the final image may be re-generated to include the afterimage reduction patterns in which the opaque areas and/or semi-transparent areas are moved adaptively up, down, left or right.

Here, the generating of the final image may be performed if a request signal requesting an afterimage reduction is received from a user interface, or if a time during which the main image is displayed exceeds a specified time.

The foregoing and/or other aspects of the present general inventive concept are also achieved by providing a method of reducing afterimage in a display device, the method including displaying a main image on a display unit, generating a pattern of opaque areas and/or semi-transparent areas to combine with the main image, combining the pattern with the main image, and displaying the main image with the pattern of opaque areas and/or semi-transparent areas overlapped therewith such that the colors of the main image are changed where the overlap occurs.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
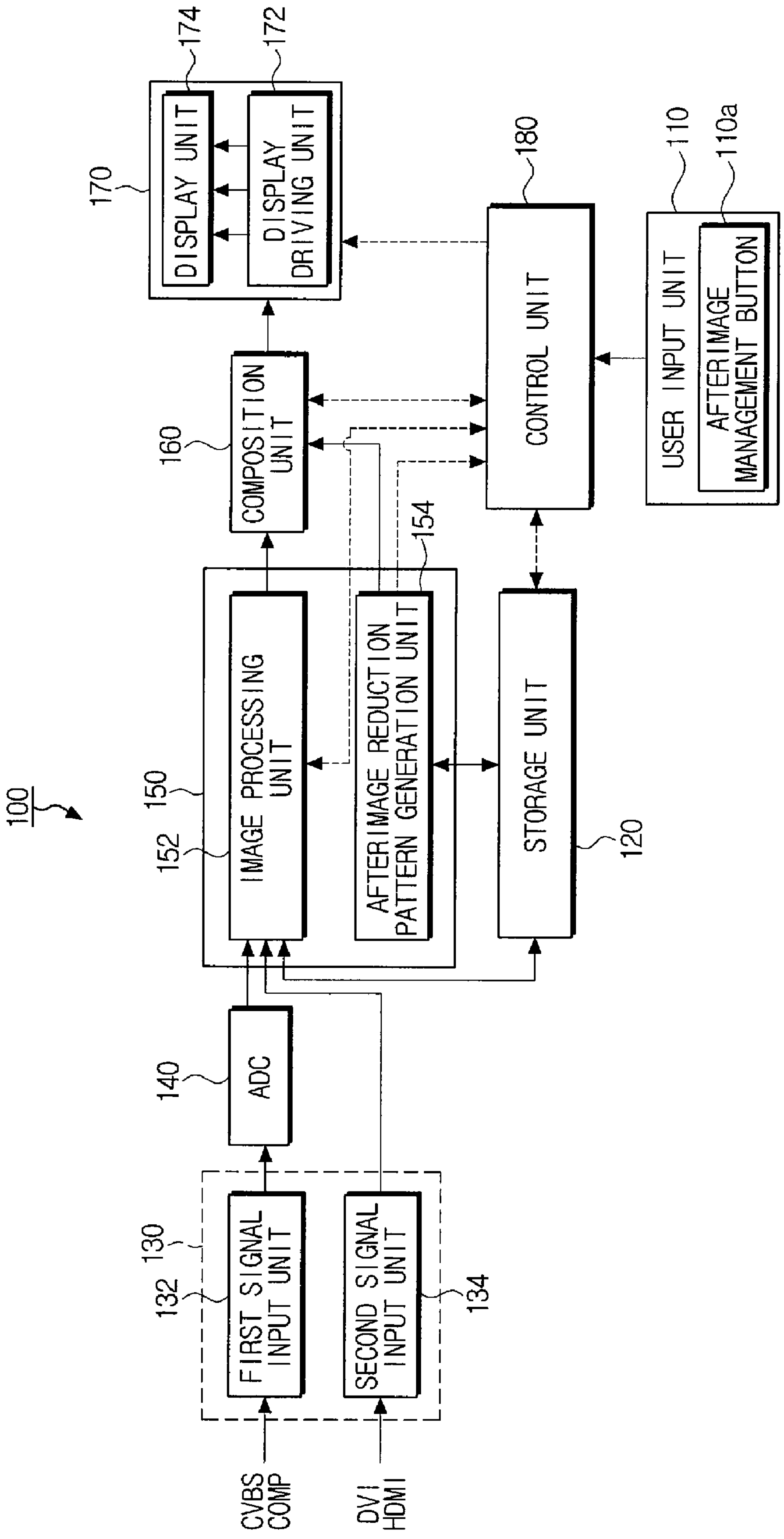
FIG. 1 is a block diagram illustrating a display device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
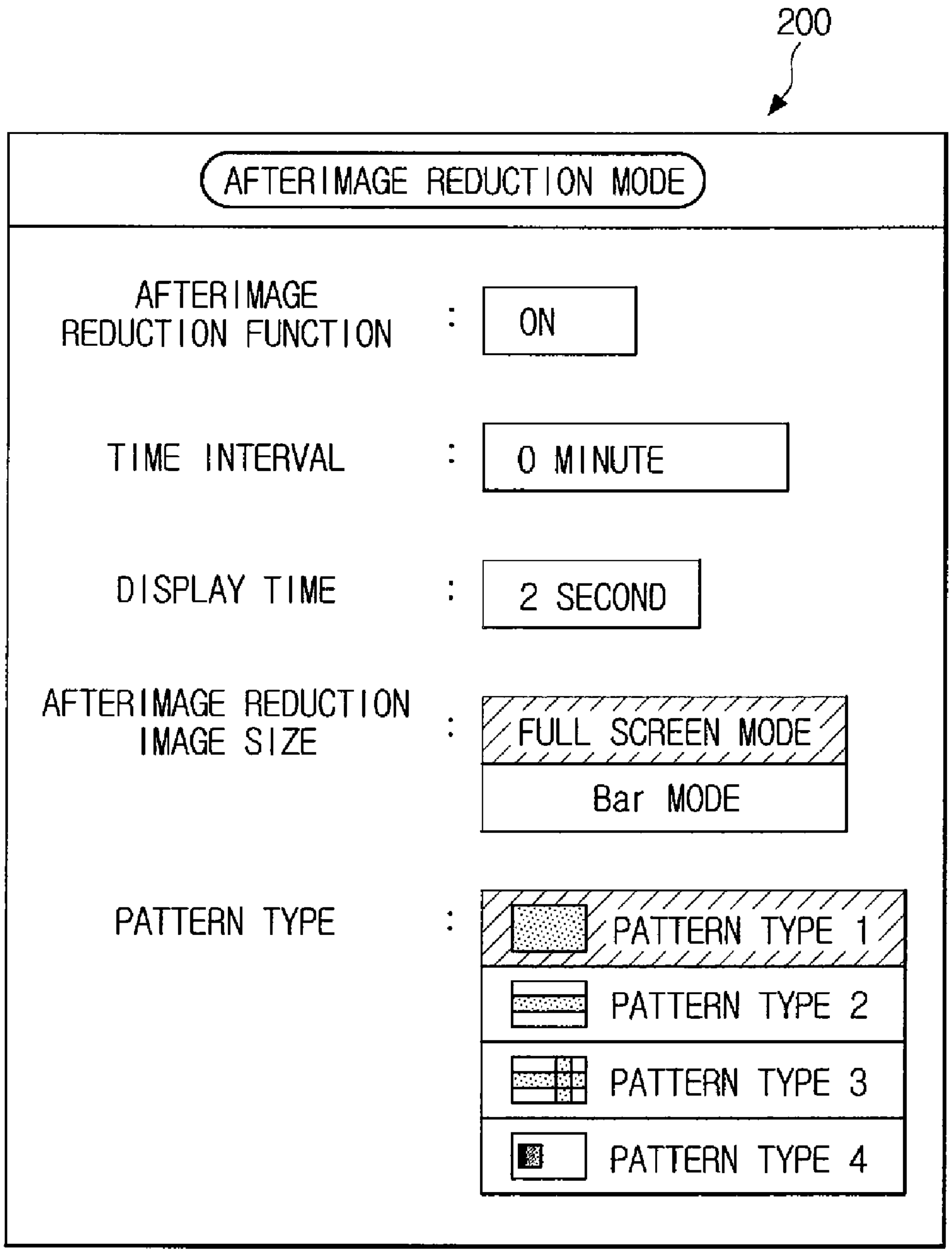
FIG. 2 is a diagram illustrating an example of a menu screen used to set an afterimage reduction mode, according to an embodiment of the present general inventive concept.

FIG. 1 is a block diagram illustrating a display device 100 capable of reducing an afterimage according to an embodiment of the present general inventive concept. FIG. 2 illustrates a menu screen 200 by which an afterimage reduction mode may be set according to an embodiment of the present general inventive concept.

The display device 100 in FIG. 1 includes a user input unit 110, a storage unit 120, a signal input unit 130, an analog/digital converter 140, a signal processing unit 150, a composition unit 160, a display panel 170, and a control unit 180.

The display device 100 displays a visible image signal, and although the display device 100 may be a device that also outputs an audio signal, the description below focuses on the display of the image signal. Moreover, the display device 100 according to the present embodiment is provided with an afterimage reduction function, and may be embodied as a flat screen television with a tuner (not illustrated).

The user input unit 110 may include number keys, direction keys, an ‘enter’ key, and/or other keys in order to select a desired function on the display device 100. The user input unit 110 transmits a signal selected by a user via the user input unit 110 to the control unit 180. The user input unit 110 may be disposed on a housing of the display device 100, or may be embodied as a remote control device.

The user input unit 110 of the present embodiment also includes an afterimage management button 110a. If the afterimage management button 110a is selected by a user, the user input unit 110 outputs a request signal requesting afterimage reduction to the control unit 180, which changes to an afterimage reduction mode and/or displays the menu screen 200 as illustrated in FIG. 2.

The storage unit 120 may be a non-volatile memory element to store one or more afterimage reduction patterns having one or more opaque areas and/or one or more semi-transparent areas in order to reduce the afterimage. The exemplary embodiment of using the opaque area is described herein after. In this case, the afterimage reduction patterns are stored in the storage unit 120 according to their respective size(s) and pattern type(s).

For example, with reference to a full screen mode selectable in the menu screen 200 of FIG. 2, a plurality of afterimage reduction patterns of pattern types 1, 2, 3 and 4 are stored. A large enough number of the afterimage reduction patterns are stored so that all the opaque areas on each of the afterimage reduction patterns can replace all pixels on a main image being displayed on a display unit 174 of the display panel 170 at least once. The main image corresponds to an external image or video signal received via the signal input unit 130.

Also, with reference to a bar mode selectable in the menu screen 200, one afterimage reduction pattern is stored for each of the categories from the pattern type 1 to the pattern type 4. This is because the bar mode implements the afterimage reduction function by changing a location at which the opaque areas stored on the afterimage reduction patterns are displayed on the main image. In the case of the bar mode, each of the afterimage reduction patterns may be stored also with a relative initial location value to be displayed initially on a display unit 174 of the display panel 170.

Each of the afterimage reduction patterns is formed quadrangularly with an aspect ratio as indicated below.

$$\text{aspect ratio}=x:y, \text{ (if } x=a \text{ then } y\neq b, \text{ and if } y=b \text{ then } x\neq a)$$

Here, ‘a’ represents a width of the display unit 174, ‘b’ represents a height of a display area, ‘x’ represents a width of the afterimage reduction pattern, and ‘y’ represents a height of the afterimage reduction pattern.

The one or more opaque areas on the afterimage reduction patterns may be either the same size as or smaller than the afterimage reduction pattern. Each of the afterimage reduction patterns has a fixed aspect ratio, and an area outside the opaque area of the afterimage reduction pattern forms a transparent area.

The opaque area of the afterimage reduction pattern is a block of size m×n, and can be composed of either bitmaps or RGB.

Also, the transparent areas of the afterimage reduction pattern may be set as follows. In the situation that 8-bit color is used, a color corresponding to a predetermined level between 0 and 255 may be designated as transparent, and an actual color area may be designated as a level outside the level designated as transparent. In the present embodiment, an example is used in which the opaque areas are defined as being black, however the opaque areas are not restricted to being black and may be other colors.

Also, the storage unit 120 stores information (such as the size of the menu screen 200) to form the menu screen 200 of FIG. 2 on the display unit 174.

Referring again to FIG. 1, the signal input unit 130 is a terminal or port to input the image signal from a signal source. The signal input unit 130 includes a first signal input unit 132 and a second signal input unit 134.

The first signal input unit 132 inputs an analog image signal, and the second signal input unit 134 inputs a digital image signal. Examples of analog image signals include CVBS (composite video banking sync) signals, component signals (COMP), or Super-Video signals, and examples of digital image signals include DVI (digital video interface) and HDMI (high definition multimedia interface).

The ADC 140 converts the analog image signals input through the first signal input unit 132 into digital image signals.

The signal processing unit 150 includes an image processing unit 152 and an afterimage reduction pattern generation unit 154.

The image processing unit 152 processes the digital image signals input from the ADC 140 or the second signal input unit 134 into the visible image signals and generates the main image from the visible image signals. For example, the image processing unit 152 decodes the digital image signal, regulates a white balance, and processes various signals to scale a size of the main image according to a set screen resolution.

Additionally, if the afterimage management button 110a is selected, the image processing unit 152 generates the menu screen 200 as illustrated in FIG. 2 using the menu screen information stored in the storage unit 120, and provides the menu screen information to a composition unit 160 together with the main image. The menu screen 200 is a user interface through which a mode of the display device 100 may be adjusted to the afterimage reduction mode. The menu screen 200 may also be used to change the afterimage reduction pattern used in the afterimage reduction mode or regulate the time and other parameters of the afterimage reduction mode.

Referring to FIG. 2, the user can set an afterimage reduction function to ‘ON’ or ‘OFF,’ and can select a time interval after which the afterimage reduction mode is entered, a time at which the afterimage reduction pattern is displayed (i.e., a display time), a size of the afterimage reduction pattern and a specific pattern classified according to the size using the user input unit 110.

If ‘ON’ is selected in the menu screen 200 for the after image reduction function, the afterimage reduction function is initiated. If ‘OFF’ is selected in the menu screen 200 for the afterimage reduction function, the afterimage reduction function is stopped.

Selecting the ‘time interval’ sets the time after which the afterimage reduction function is implemented if the main image is displayed without change for longer than the set time interval. For example, if a time interval of 20 minutes is selected, the control unit 180 measures a time during which the main image is displayed on the display unit 174, and if the measured time exceeds 20 minutes, the afterimage reduction function is activated.

‘Display time’ refers to the time for which a single afterimage reduction pattern is displayed on the display unit 174.

‘Afterimage reduction image size’ selects the size of the image to be used for afterimage reduction. If ‘full screen mode’ is selected, an afterimage reduction pattern with an area greater than or equal to an area of the entire screen of the display unit 174 is used. If ‘bar mode’ is selected, an afterimage reduction pattern with an area smaller than the area of the entire screen of the display unit 174 is used.

‘Pattern’ indicates an arrangement of the opaque areas and non-opaque areas (i.e., transparent areas), and the patterns are stored according to size.

Each pattern using the ‘full screen mode’ will now be explained in greater detail. Pattern type 1 is a pattern in which a plurality of opaque areas are distributed evenly over the entire afterimage reduction pattern. Pattern type 2 is a pattern in which a plurality of opaque areas are distributed in fixed areas of the afterimage reduction pattern. Pattern type 3 is a pattern including one or more opaque areas in a bar form, either lengthwise, crosswise, or intersecting in a cruciform pattern in fixed areas of the afterimage reduction pattern. Pattern type 4 is a pattern in which a plurality of connecting bars are formed on the afterimage reduction pattern.

Each of the patterns using the 'bar mode' will now be explained in greater detail. Pattern type 1 is a pattern in which a plurality of opaque areas are distributed over the entire area of the afterimage reduction pattern. Pattern type 2 is a pattern in which a plurality of opaque areas are distributed over the entire area of an afterimage reduction pattern which is smaller than the area of the entire screen of the display unit 174. Pattern type 3 is a pattern in which one or more 'bar type' opaque areas are formed crosswise or lengthwise on the afterimage reduction pattern. Pattern type 4 is a pattern in which a plurality of connecting bars are formed on the afterimage reduction pattern.

Each item on the menu screen 200 described above can be selected and/or adjusted using the user input unit 110.

The afterimage reduction mode is described in greater detail below, referring to FIGS. 2 to 11.

If the afterimage reduction function of the display device 100 is activated, the afterimage reduction pattern generation unit 154 illustrated in FIG. 1 generates an image to reduce the afterimage using the one or more afterimage reduction patterns stored in the storage unit 120. Here, if the afterimage reduction pattern is composed of initial bitmaps, an image signal output to the composition unit 160 changes to a signal type which is the same as that of the main image and is output accordingly.

The composition unit 160 outputs the menu screen 200 or the main image input from the image processing unit 152 to the display panel 170.

If the main image from the image processing unit 152 and the afterimage reduction pattern from the afterimage reduction image generation unit 154 are input to the composition unit 160, the composition unit 160 composes the afterimage reduction pattern together with the main image and outputs a final image. The composition unit 160 may combine the main image with the afterimage reduction pattern. At this time, the composition unit 160 replaces pixels in the main image corresponding to a relative location of opaque areas in the afterimage reduction pattern with a color of the opaque areas of the afterimage reduction pattern and outputs the final image.

The display panel 170 includes a display driving unit 172 and the display unit 174. The display driving unit 172 drives the display unit 174 so that a processed image is shown on the display unit 174.

The display unit 174 displays the main image generated in the signal processing unit 150, the menu screen 200, and the afterimage reduction pattern when the display device 100 is in an active state due to the control of the control unit 180. The display panel 170 is flat-screen panel, for example, a PDP (plasma display panel), an LCD (liquid crystal display), or another kind of flat-screen panel.

If the display unit 174 is an LCD panel and the display device 100 sets the afterimage reduction mode so that the afterimage reduction pattern is displayed, the display driving unit 172 drives the display unit 174 so that pixels of rows or columns of the main image corresponding to the displayed afterimage reduction pattern may be changed to black or another opaque color. For example, when the 'bar mode' afterimage reduction patterns are displayed, the display driving unit 172 converts all the pixels of a first line of the display unit 174 to an opaque color and, after a predetermined time, shifts to a next line and converts all the pixels in the next line to the opaque color. This can be performed in one or more rows or columns, and can be adjusted according to pattern types 1 to 4 of the 'bar mode'.

The control unit 180 controls all the activity of the display device 100 using the signal transmitted from the user input unit 110 inputted or selected by a user, and a control program stored in the memory (not illustrated).

If the afterimage reduction function is activated while the main image is displayed on the display unit 174, the control unit 180 generates one or more afterimage reduction patterns from stored default values. Also, if an image pattern used as the afterimage reduction pattern is changed using the menu screen 200, the control unit 180 generates the one or more afterimage reduction patterns corresponding to the changed image patterns and controls each block so that the one or more opaque areas on each of the afterimage reduction patterns may replace every pixel of the main image at least once, and the afterimage reduction pattern may be displayed.

Here, after the afterimage management button **110*a* is selected and the menu screen 200 is displayed as illustrated in FIG. 2, if the afterimage reduction function is 'ON' and a time interval of '0 minutes' is selected, the control unit 180 immediately switches to the afterimage reduction mode and the afterimage reduction function is activated. The control unit 180 also calculates the time the main image is displayed without change on the display unit 174. If the calculated time exceeds the time interval (in our previous example '20 minutes') set on the menu screen 200, the control unit 180** converts to the afterimage reduction mode and activates the afterimage reduction function.

The operation of the control unit 180 in the afterimage reduction function is described below referring to FIGS. 1 to 11. The menu screen 200 as illustrated in FIG. 2 is displayed by selecting the afterimage management button **110*a*, after the final image including the main image and the afterimage reduction pattern is displayed on the display unit 174**.

In FIGS. 3A to 11, 'a' represents the width of the display unit 174, 'b' represents the height of the display unit 174, 'x' represents the width of the afterimage reduction pattern, 'y' represents the height of the afterimage reduction pattern, and █ represents an opaque area of the afterimage reduction pattern.

FIGS. 3A to 3D illustrate the final image shown on the display unit 174 when the full screen mode and the pattern type 1 are selected from the menu screen 200 illustrated in FIG. 2.

Referring to FIGS. 1, 2, and 3A through 3D, the afterimage reduction patterns (x×y) used in the full screen mode and the pattern type 1 have a plurality of opaque areas distributed evenly over the entire area of the afterimage reduction pattern, and the opaque areas are arranged differently according to the afterimage reduction pattern.

If the full screen mode and the pattern type 1 are selected using the menu screen 200 of FIG. 2, the control unit 180 controls the signal processing unit 150, the composition unit 160, and the display panel 170 so that the plurality of afterimage reduction patterns stored corresponding to the full screen mode and the pattern type 1 in the storage unit 120 are generated and combined with the main image to be displayed on the display unit 174. That is, the full screen mode is a mode which activates the afterimage reduction function using a plurality of afterimage reduction patterns and can alternate the display of the afterimage reduction patterns.

Figure 3A:
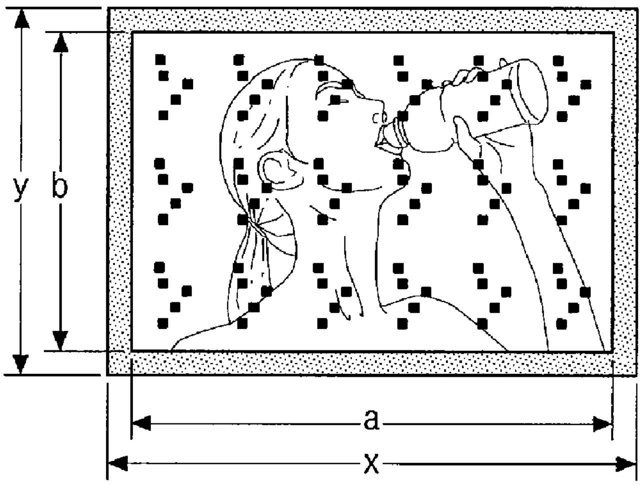
FIGS. 3A to 3D illustrate a final image displayed on a display unit, if a full screen mode and a pattern type 1 are selected from the menu screen of FIG. 2, FIGS. 4A to 4D illustrate a final image displayed on the display unit, if the full screen mode and a pattern type 2 are selected from the menu screen of FIG. 2, FIGS. 5A to 5B illustrate an embodiment of a final image displayed on the display unit, if the full screen mode and a pattern type 3 are selected from the menu screen of FIG. 2, FIGS. 6A to 6B illustrate another embodiment of a final image displayed on the display unit, if the full screen mode and the pattern type 3 are selected from the menu screen of FIG. 2.
Figure 3B:
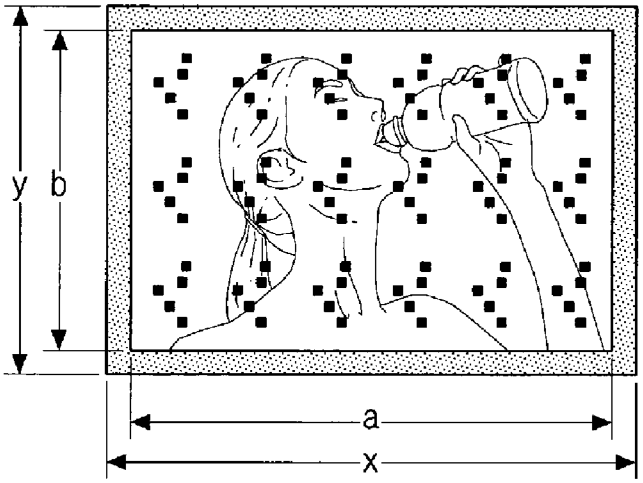
Figure 3C:
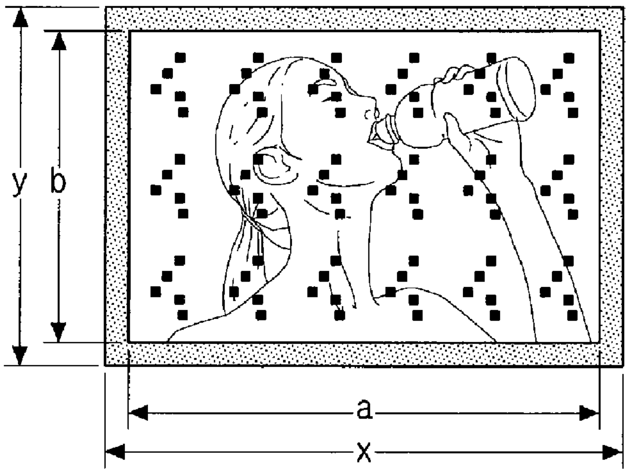
Figure 3D:
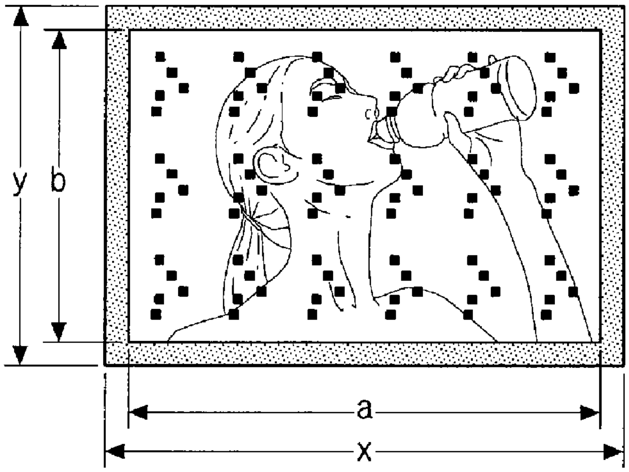
Figure 4A:
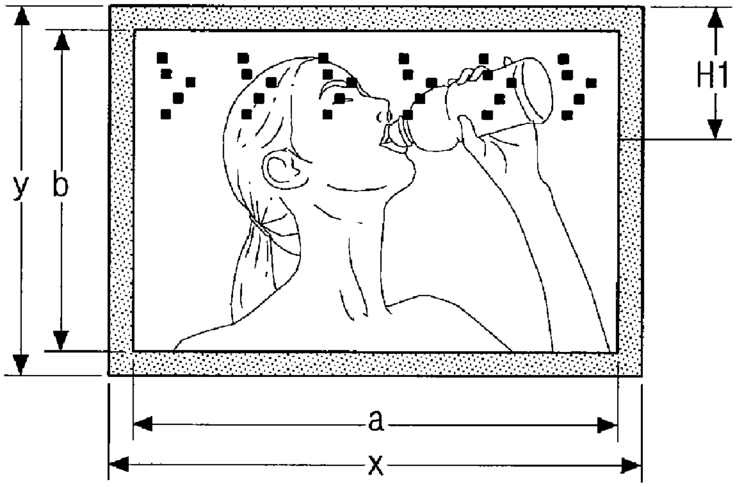
Figure 4B:
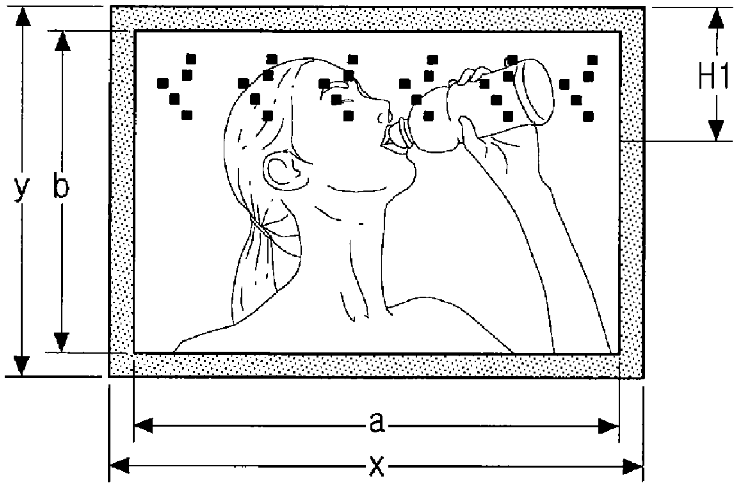
Figure 4C:
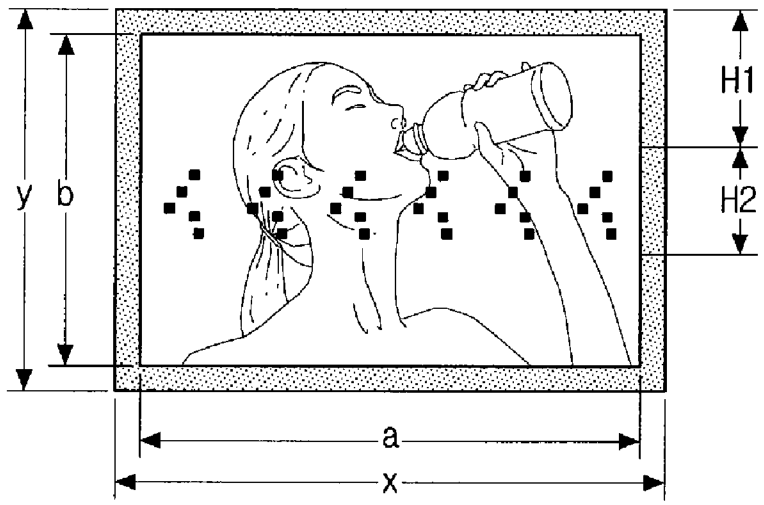
Figure 4D:
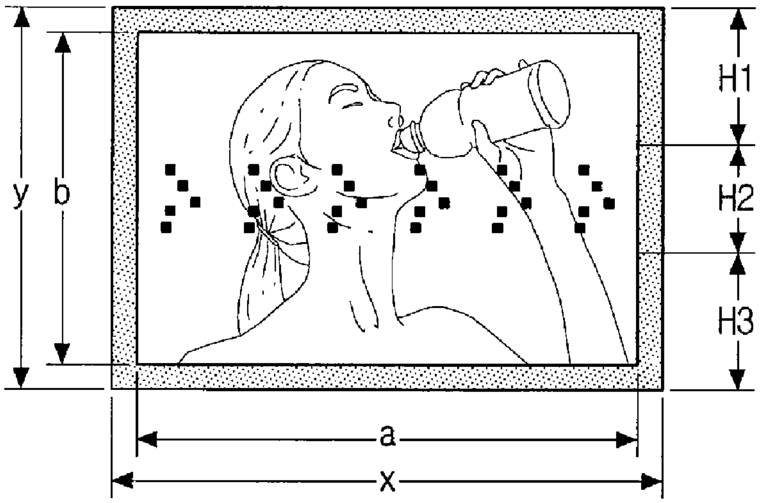

A sufficient number of afterimage reduction patterns are stored in the storage unit 120 so that all of the opaque areas on each of the afterimage reduction patterns can replace each pixel of the main image at least once by alternating the display of the afterimage reduction patterns. In other words, by varying the afterimage reduction pattern in the full screen mode and the pattern type 1, each pixel of the main image is replaced by an opaque area in one of the stored afterimage reduction patterns. In this case, the manner in which the plurality of opaque areas are distributed differs according to the afterimage reduction pattern. As a result, the control unit 180 generates the afterimage reduction pattern with the highest priority rating among the plurality of afterimage reduction patterns and displays the generated afterimage reduction pattern on the display area of the display unit 174 for 2 seconds together with the main image, as illustrated in FIG. 3A. After the 2 seconds elapses, the control unit 180 generates a new afterimage reduction pattern as illustrated in FIG. 3B and displays the new afterimage reduction pattern for 2 seconds together with the main image. Similarly, the afterimage reduction portions of FIGS. 3C and 3D are also then displayed for 2 seconds.

Additionally, if each of the afterimage reduction patterns stored in the storage unit 120 is displayed at least once, the control unit 180 determines that all the pixels of the main image have changed color at least once and either terminates the afterimage reduction function or repeats the operations described above.

FIGS. 4A to 4D illustrate the final image displayed on the display area of the display unit 174 when the full screen mode and the pattern type 2 are selected in FIG. 2.

Referring to FIGS. 1, 2, and 4A to 4D, afterimage reduction patterns (x×y) used in the full screen mode with the pattern type 2 have opaque areas distributed in fixed areas. More specifically, a plurality of opaque areas are distributed in fixed areas at a top portion H1, middle portion H2, and bottom portion H3 of the afterimage reduction pattern.

If the full screen mode and the pattern type 2 are selected from the menu screen 200 (FIG. 2), the control unit 180 generates a plurality of afterimage reduction patterns that correspond to the full screen mode with the pattern type 2 and are stored in the storage unit 120 in a set order, composes (i.e., combines) the afterimage reduction patterns with the main image as the final image, and displays the final image on the display unit 174. The generated afterimage reduction patterns may be alternatingly displayed with the main image.

For example, if afterimage reduction patterns are used which have opaque areas distributed only at the top portion H1 thereof (for example, in FIGS. 4A and 4B), the control unit 180 replaces all the pixels in the top portion of the main image with opaque areas at least once. Likewise, if afterimage reduction patterns are used which have opaque areas distributed only in the middle portion H2 thereof (for example, in FIGS. 4C and 4D), the control unit 180 replaces all the pixels in the middle portion of the main image with opaque areas at least once. If afterimage reduction patterns are used which have opaque areas distributed only at the bottom portion H3 thereof (not shown), the control unit 180 replaces all the pixels at the bottom portion of the main image with opaque areas at least once. By this process, afterimage reduction covers the entire main image at least once.

Figure 5A:
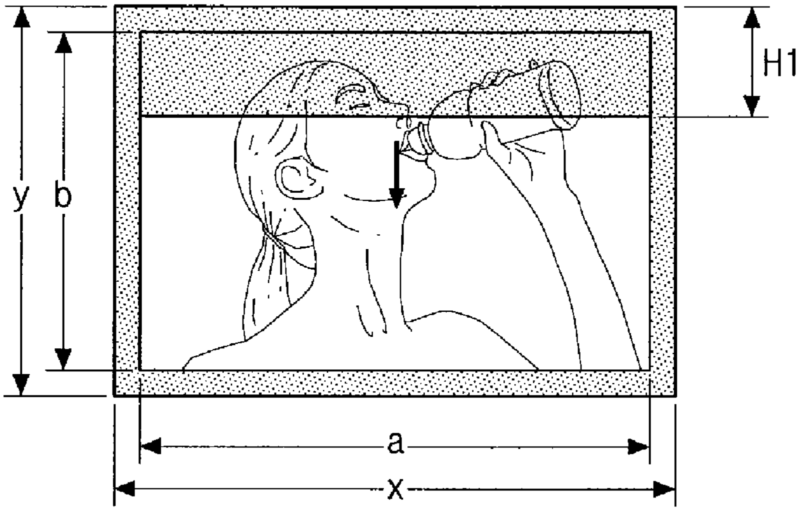
Figure 5B:
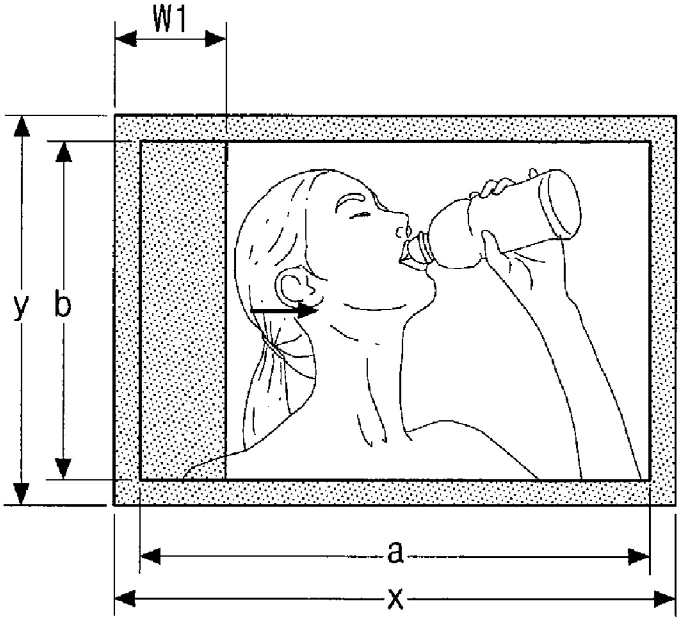

FIGS. 5A and 5B illustrate a first form of the final image displayed on the display unit 174 when the full screen mode and the pattern type 3 are selected in the menu screen 200 in FIG. 2.

Referring to FIGS. 1, 2, 5A and 5B, the afterimage reduction patterns (x×y) used with the full screen mode and the pattern type 3 may be horizontal bars or vertical bars.

If the full screen mode and the pattern type 3 are selected from the menu screen 200 (FIG. 2), the control unit 180 generates, in a set order, a plurality of afterimage reduction patterns stored in the storage unit 120, which correspond to the full screen mode and the pattern type 3. The control unit 180 then controls the composition unit 160 to compose (i.e., combine) the afterimage reduction patterns with the main image to obtain the final image, and controls the display unit 174 to display the final image. Here, the generated afterimage reduction patterns may be alternatingly displayed with the main image.

More specifically, each of the afterimage reduction patterns is formed with opaque areas and may be either horizontal bars (x×H1) or vertical bars (w1×y). Accordingly, if the afterimage reduction pattern as illustrated in FIG. 5A is displayed for a set period (e.g., the display time of FIG. 2), the control unit 180 controls the signal processing unit 150 to repeatedly generate the afterimage reduction patterns displayed at a location that is moved in a direction represented by a solid black arrow (FIG. 5A) by as much as a width H1 of the horizontal bars (or the width of the opaque areas to be exact). Likewise, if the image reduction pattern as illustrated in FIG. 5B is displayed for a set period (e.g., the display time), the control unit 180 controls the signal processing unit 150 to repeatedly generate the afterimage reduction patterns displayed at a location that is moved in a direction represented by a solid black arrow (FIG. 5B) by as much as a width W1 of the vertical bars (or the opaque areas to be exact).

If the full screen mode and the pattern type 3 are selected, the afterimage reduction function can be designed to display the afterimage reduction patterns as illustrated in FIGS. 5A and 5B at random, or to display only one predetermined afterimage reduction pattern.

Figure 6A:
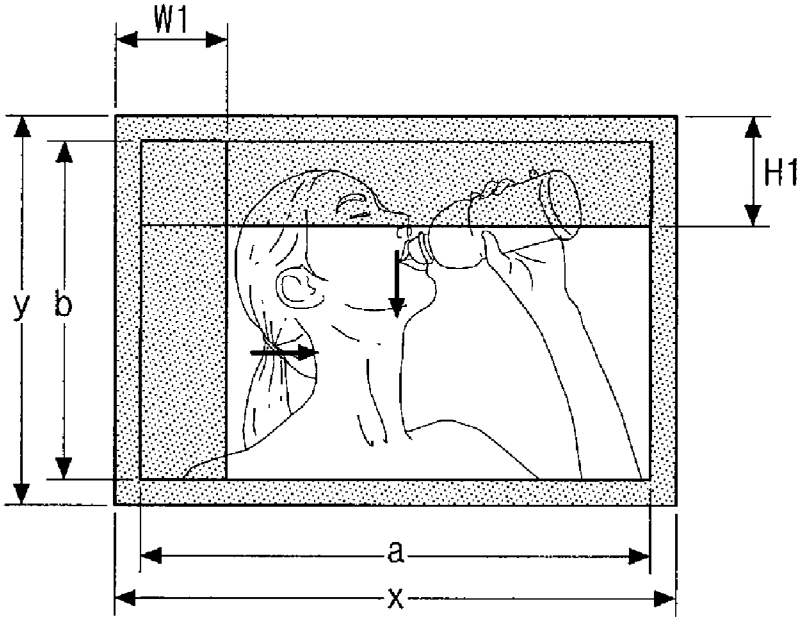
Figure 6B:
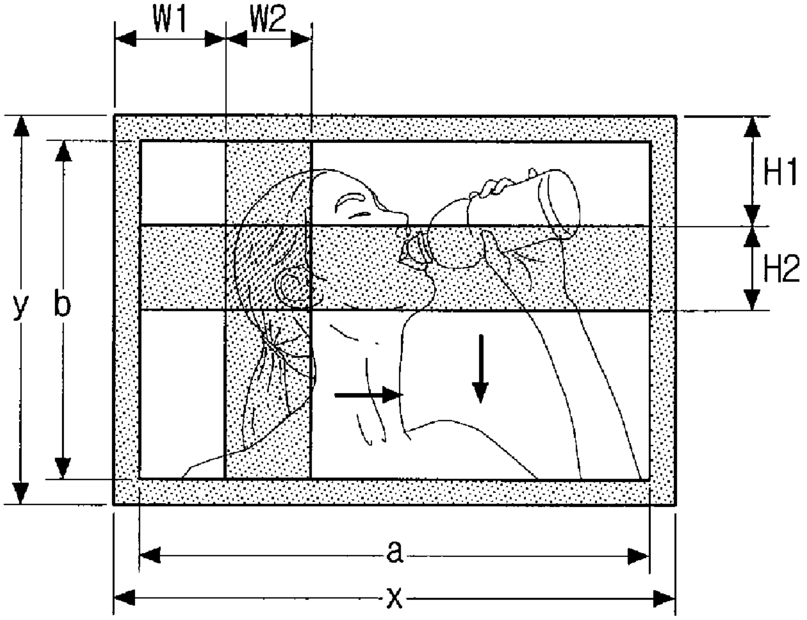

FIGS. 6A and 6B illustrate another embodiment of the final image displayed on the display unit 174 when the full screen mode and the pattern type 3 are selected in the menu screen 200 of FIG. 2.

Referring to FIGS. 1, 2, 6A and 6B, the afterimage reduction patterns (x×y) using the full screen mode with the pattern type 3 include opaque areas in which horizontal bars (x×H1) and vertical bars (w1×y) intersect at right angles as illustrated in FIGS. 6A and 6B.

If the full screen mode and the pattern type 3 are selected from the menu screen 200 (FIG. 2), the control unit 180 generates a plurality of the afterimage reduction patterns in a set order which corresponds to the full screen mode and the pattern type 3 in the storage unit 120. The control unit 180 then controls the composition unit 160 to compose (i.e., combine) the main image with the generated afterimage reduction patterns to obtain the final image. Accordingly, an initial afterimage reduction pattern as illustrated in FIG. 6A is displayed on the display unit 174 with the main image. If the initial afterimage reduction pattern is displayed for a set time (e.g., the display time of FIG. 2), the control unit 180 then generates and processes an afterimage reduction pattern (i.e., a next afterimage reduction pattern) to be displayed as illustrated in FIG. 6B. The horizontal bars (x×H2) and vertical bars (w2×y) illustrated in FIG. 6B move in a direction represented by vertical and horizontal solid black arrows, respectively, by as much as a width of the horizontal bars (x×H1) and a width of the vertical bars (w1×y) illustrated in FIG. 6A. The afterimage reduction pattern generation unit 154 generates the afterimage reduction patterns in which the horizontal and vertical bars of the opaque areas are moved in the directions of the arrows until the opaque areas of the afterimage reduction pattern have replaced all the pixels of the main image.

Figure 7:
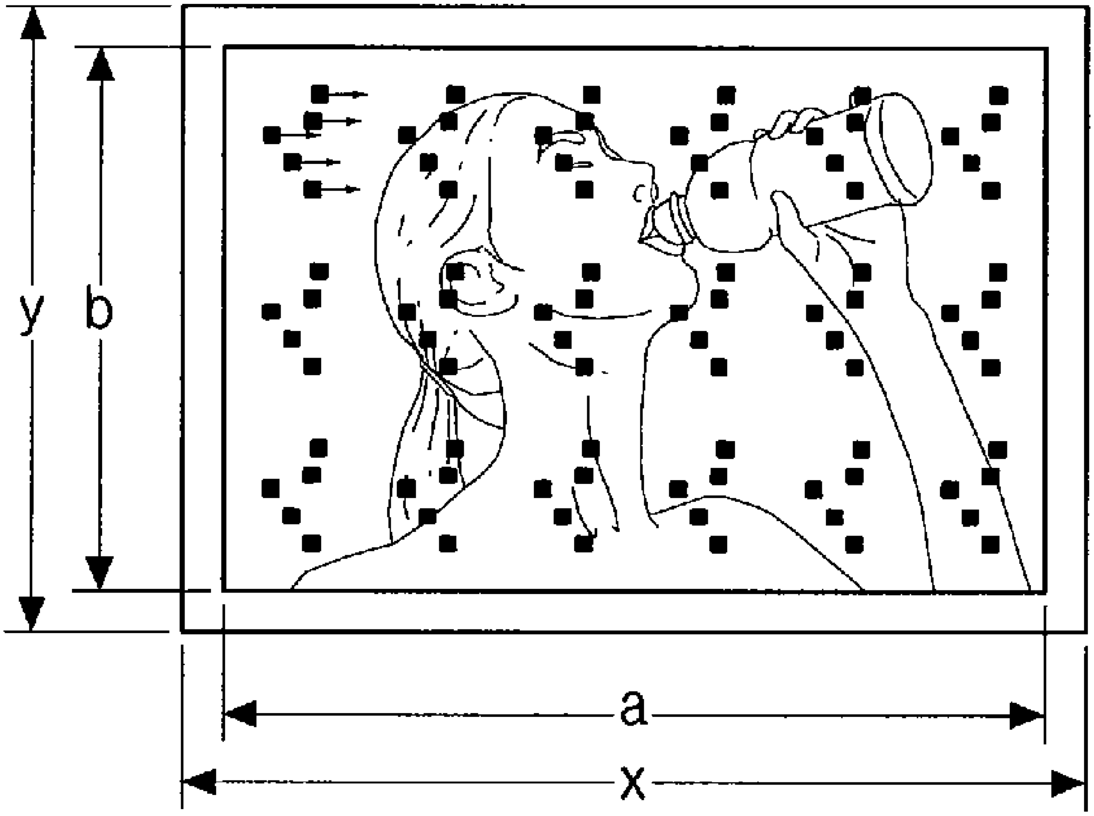
FIG. 7 illustrates a final image displayed on the display unit, if a bar mode and the pattern type 1 are selected from the menu screen of FIG. 2, FIGS. 8A and 8B illustrate a final image displayed on the display unit, if the bar mode and the pattern type 2 are selected from the menu screen of FIG. 2, FIGS. 9A and 9B illustrate an embodiment of a final image displayed on the display unit, if the bar mode and the pattern type 3 are selected from the menu screen of FIG. 2, FIGS. 10A and 10B illustrate another embodiment of a final image displayed on the display unit, if the bar mode and the pattern type 3 are selected from the menu screen of FIG. 2.

FIG. 7 illustrates the final image displayed on the display unit 174 when the bar mode and the pattern type 1 are selected.

Referring to FIGS. 1, 2, and 7, afterimage reduction patterns (x×y) used with the bar mode and the pattern type 1 may include a plurality of opaque areas distributed over an entire area of the afterimage reduction pattern.

If the bar mode and the pattern type 1 are selected from the menu screen 200 (FIG. 2), the control unit 180 processes afterimage reduction patterns corresponding to the bar mode and the pattern type 1 from the storage unit 120 and composes the processed afterimage reduction patterns with the main image in order to display the afterimage reduction patterns for a fixed period (e.g., the display time) on the display unit 174. If the time period elapses, the afterimage reduction pattern generation unit 154 generates new afterimage reduction patterns in which the plurality of opaque areas are moved in a direction represented by solid black arrows in FIG. 7.

Figure 8A:
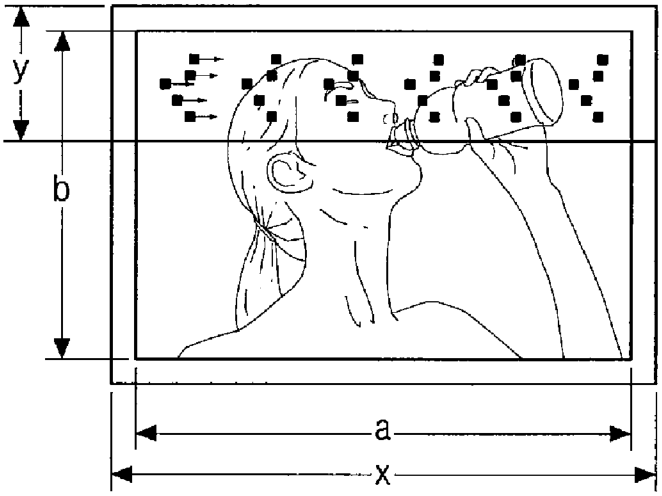
Figure 8B:
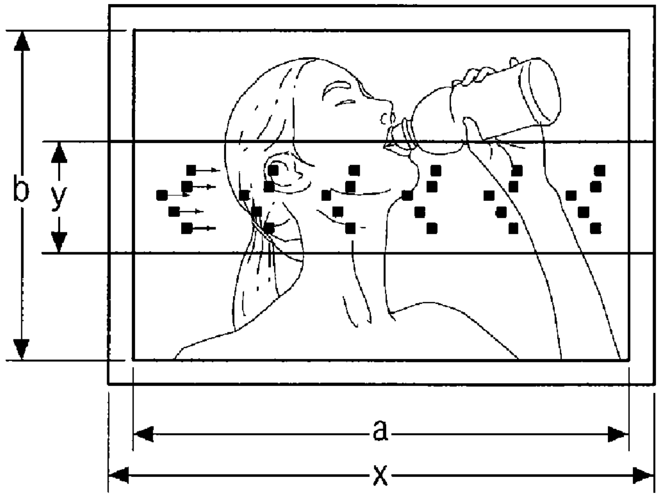

FIGS. 8A and 8B illustrate the final image displayed on the display unit 174 when the bar mode and the pattern type 2 are selected.

Referring to FIGS. 1, 2, 8A and 8B, afterimage reduction patterns (x×y) using the bar mode and the pattern type 2 are smaller than a total screen size of the display unit 174, and a plurality of opaque areas are distributed on the afterimage reduction pattern.

Accordingly, if the bar mode and the pattern type 2 are selected, the control unit 180 generates the afterimage reduction pattern as illustrated in FIG. 8A and displays the afterimage reduction pattern for a fixed time period (e.g., the display time in FIG. 2) on the display unit 174. If the fixed time period passes, the afterimage reduction pattern generation unit 154 generates new afterimage reduction patterns to move a location of the opaque areas in a direction represented by solid black arrows illustrated in FIG. 8A.

If this process is to be repeated until all the pixels of the main image (a×b) have been replaced by opaque areas, the afterimage reduction pattern generation unit 154 moves the afterimage reduction pattern as illustrated in FIG. 8B (i.e., downward), and repeats the operations described above.

Figure 9A:
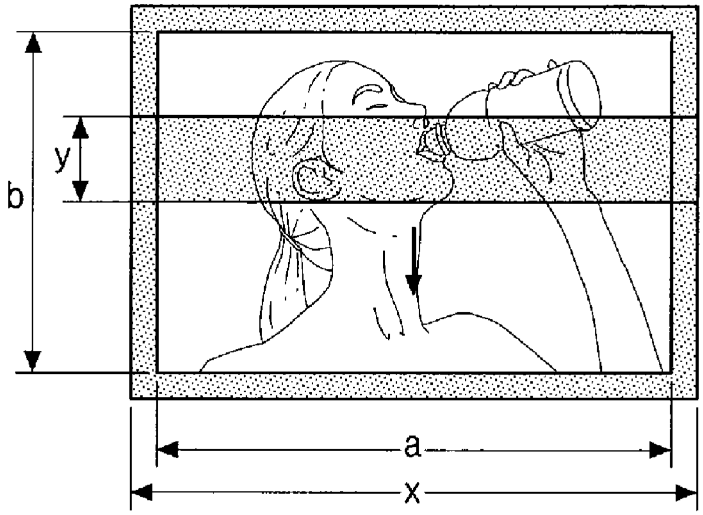
Figure 9B:
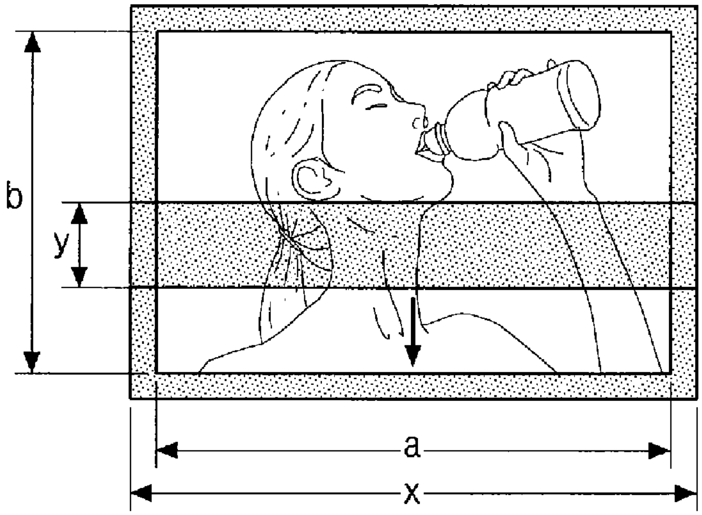

FIGS. 9A and 9B illustrate an embodiment of the final image displayed on the display unit 174 when the bar mode and the pattern type 3 are selected.

Referring to FIGS. 1, 2, 9A and 9B, afterimage reduction patterns (x×y) in which the bar mode and the pattern type 3 are used have an opaque area shaped as horizontal bars. Specifically, the afterimage reduction pattern has a single opaque area, which is displayed as a bar of a single color.

If the bar mode and the pattern type 3 are selected, the control unit 180 processes a stored afterimage reduction pattern, which corresponds to the bar mode and the pattern type 3 in the storage unit 120 such that the afterimage reduction patterns are generated as illustrated in FIG. 9A. The control unit 180 then controls the composition unit 160 to compose (i.e., combine) the afterimage reduction patterns with the main image to obtain the final image, and then controls the display unit 174 to display the final image having the afterimage reduction patterns for a fixed period of time. If the fixed period of time passes, the afterimage reduction image generation unit 154 generates a new afterimage reduction pattern to move by a width of the afterimage reduction pattern in a direction represented by a solid black arrow illustrated in FIG. 9B.

When the bar mode and the pattern type 3 are selected, the present embodiment can be designed to use the afterimage reduction patterns having either opaque areas of horizontal bars or opaque areas of vertical bars.

Figure 10A:
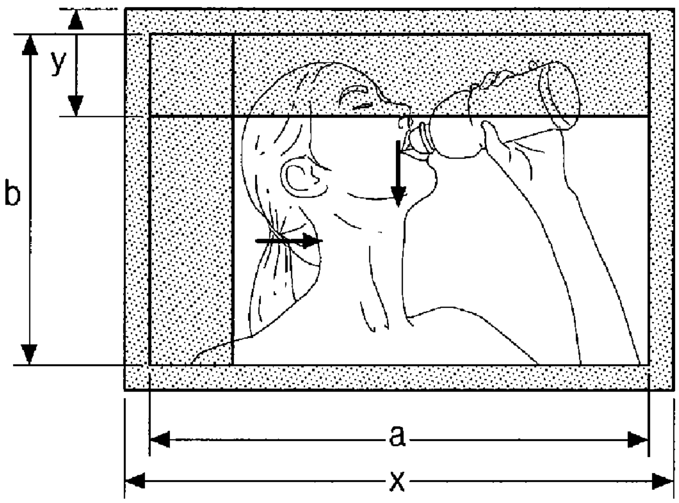
Figure 10B:
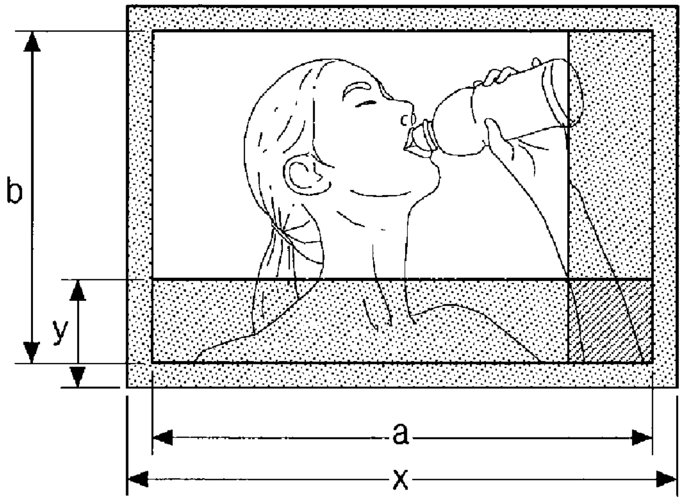

FIGS. 10A and 10B illustrate another embodiment of the final image displayed on the display unit 174 when the bar mode and the pattern type 3 are selected from the menu screen 200 in FIG. 2.

Referring to FIGS. 1, 2, 10A and 10B, the afterimage reduction patterns in which the bar mode and the pattern type 3 are used have opaque areas (represented by shaded areas of FIGS. 10A and 10B) in which horizontal bars and vertical bars intersect.

If the bar mode and the pattern type 3 are selected, the control unit 180 processes the stored afterimage reduction pattern which corresponds to the bar mode and the pattern type 3 from the storage unit 120 so that the afterimage reduction pattern is generated and composed together with the main image to obtain the final image. The control unit 180 then controls the display unit 174 to display the final image for a fixed period of time as illustrated in FIG. 10A. If the fixed period of time passes, the afterimage reduction image generation unit 154 generates a new afterimage reduction pattern which is moved in a direction represented by a solid black arrow illustrated in FIG. 10A by a width of the afterimage reduction pattern.

Figure 11:
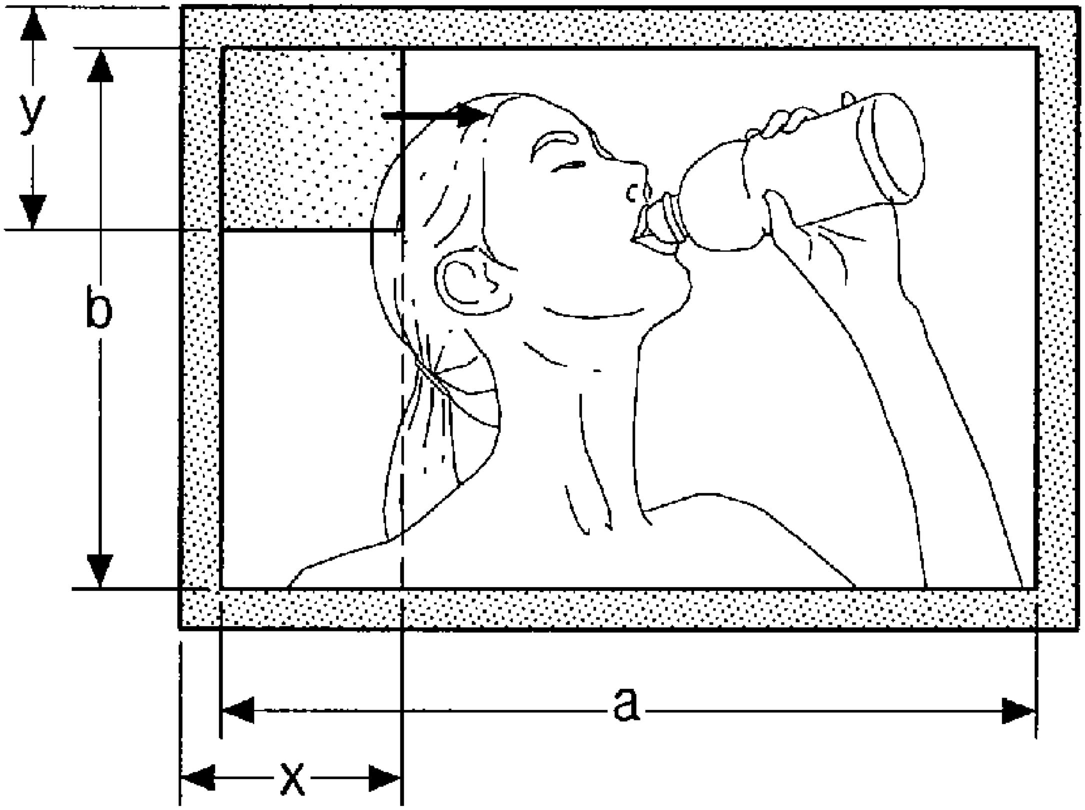
FIG. 11 illustrates a final image displayed on the display unit, if the bar mode and a pattern type 4 are selected from the menu screen of FIG. 2.

FIG. 11 illustrates the final image displayed on the display unit 174 if the bar mode and the pattern type 4 are selected from the menu screen 200 illustrated in FIG. 2.

Referring to FIGS. 1, 2, and 11, the afterimage reduction patterns using the bar mode and the pattern type 4 have a size (x×y), and have opaque areas which are formed with a gradation effect. If the bar mode and the pattern type 4 are selected using the user input unit 110, the control unit 180 generates the afterimage reduction patterns which correspond to the bar mode and the pattern type 4 stored in the storage unit 120. If the main image is displayed for a set period with the afterimage reduction patterns similar to FIG. 11, the afterimage reduction pattern generation unit 154 generates a new afterimage reduction pattern in which the afterimage reduction pattern displayed initially is moved in a direction represented by a solid black arrow in FIG. 11. Since the opaque areas can hardly be noticed due to their small size, a viewer does not see an undesirable viewing defect.

According to the embodiments of the present general inventive concept, the afterimage reduction pattern generation unit 154 repeatedly performs the operations described above until all the opaque areas of the afterimage reduction patterns for each mode have replaced all the pixels in the main image at least once.

In FIGS. 7 to 11, if the afterimage reduction pattern is displayed for longer than a fixed period of time, the afterimage reduction pattern generation unit 154 forms a new afterimage reduction pattern by moving the opaque areas in the direction(s) of the arrow(s), however, it should be understood that the opaque areas may be adaptively moved up, down, left, or right. In particular, if all the pixels of one or more horizontal lines have been replaced by the color of the opaque area, the afterimage reduction generation unit 154 moves the afterimage reduction pattern towards a next one or more horizontal lines.

Figure 12:
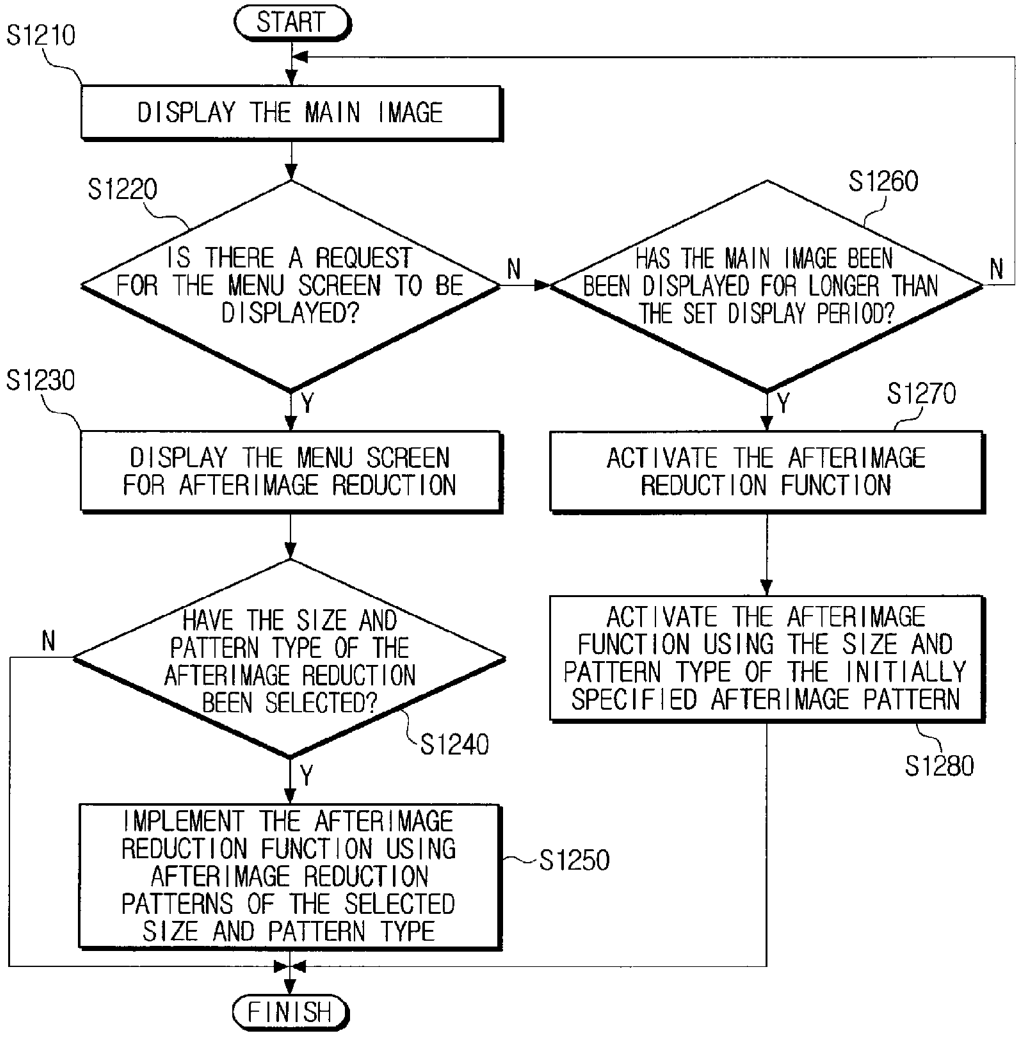
FIG. 12 is a flow chart illustrating an afterimage reduction method according to an embodiment of the present general inventive concept.

FIG. 12 is a flow diagram illustrating an afterimage reduction method. The method of FIG. 12 may be performed by the display device 100 of FIG. 1. Accordingly, for illustration purposes, the method of FIG. 12 is described below with reference to FIGS. 1 to 11.

Referring to FIGS. 1 to 12, if the afterimage management button 110*a* is selected while the main image is being displayed on the display unit 174, the control unit 180 controls the image processing unit 152 and the display panel 170 in order to generate and display the menu screen 200 as illustrated in FIG. 2 (operations S1210~S1230).

After the menu screen 200 for the afterimage reduction has been displayed on the display unit 174, if the size of the afterimage reduction pattern and the pattern type are selected from the user input unit 110 (operation S1240), the control unit 180 implements (i.e., performs) the afterimage reduction function using the afterimage reduction pattern which corresponds to the selected size and pattern type from the operation S1240 (operation S1250).

In the operation S1250, the control unit 180 controls the signal processing unit 150, the composition unit 160 and the display panel 170 in order to read and generate an afterimage reduction pattern which corresponds to the size and the pattern type selected at the operation S1240 from the storage unit 120, and to output the main image composed (i.e., combined) with the afterimage reduction pattern as a final image.

For example, if the full screen mode and the pattern type 1 are selected at the operation S1240, the control unit 180 causes the final image as illustrated in FIGS. 3A to 3D to be generated and displayed. Additionally, if the afterimage reduction patterns with the patterns of opaque areas as illustrated in FIGS. 3A and 3D are all displayed, and all the pixels of the main image are replaced by the colors of opaque areas at least once, the control unit 180 determines if the afterimage reduction function has been performed once and terminates the afterimage reduction function (i.e., the afterimage reduction function is not repeatedly performed once this determination is made).

The operation of reducing the afterimage is related to the size and the pattern type of each of the afterimage reduction patterns and has been described above referring to FIGS. 4A to 11.

The control unit 180 measures the time during which a single main image is displayed from the time when the main image is initially displayed on the display unit 174. If it is determined that the main image has been displayed for longer than the set period of time (e.g., the time interval in FIG. 2), the control unit 180 activates the afterimage reduction function.

If operation S1270 is performed, the control unit 180 implements the afterimage reduction function using the size and the pattern type of the afterimage reduction function designated as an initial (e.g., default or pre-set) value and stored in the storage unit 120. For example, if the bar mode and the pattern type 4 are designated as the initial values, the control unit 180 generates a final image as illustrated in FIG. 11 using the stored afterimage reduction pattern which corresponds to the bar mode and the pattern type 4. The control unit 180 then moves the afterimage reduction pattern in the direction of the solid black arrow of FIG. 11 or one line at a time in the direction in which it is scanned to perform the afterimage reduction function.

An example of the afterimage reduction patterns having opaque areas for afterimage reduction is described above. However, this invention is not limited to the specific embodiment described above. Thus, semi-transparent areas can be used instead of opaque areas and/or both areas can also be used by mixture. The original image can be seen indistinctly when semi-transparent areas are used.

According to the various embodiments of the present general inventive concept as described above, the afterimage reduction patterns for afterimage reduction may be quadrilateral with an aspect ratio, elliptical, or circular. Other shapes and sizes may also be used.

Additionally, the afterimage reduction patterns can be designed so that the user may change the color of the opaque areas freely using the menu screen 200 of FIG. 2. Although the embodiments above describe that a user can select the afterimage reduction patterns, it should be understood that the afterimage reduction patterns and/or sizes may be selected according to one or more preset criteria and a user need not necessarily be involved. For example, the afterimage reduction patterns, corresponding sizes, and operation parameters may be set to a default value programmed by a manufacturer or determined based on environmental factors.

Moreover, the embodiments of the present general inventive concept described above give an example in which the full screen mode and the bar mode are both applied. However, it is also possible for the display device 100 to use one of the full screen mode or the bar mode instead of both.

Also, when an afterimage reduction pattern of a full screen size is used, the afterimage reduction pattern is described above as being larger than or equal in size to the full screen of the display unit 174, however, it should be understood that afterimage reduction patterns of other sizes may also be used.

Additionally, the afterimage reduction pattern(s) used in the embodiments present general inventive concept, as described above, can be formed as an on-screen display (OSD), and the display device 100 may include an OSD processing area (not illustrated).

Afterimage reduction patterns may be formed as diverse patterns when a display device changes to an afterimage processing mode according to embodiments of the present general inventive concept. In particular, if the afterimage reduction patterns which are used have opaque areas and/or semi-transparent areas small enough to be imperceptible to a viewer, the viewer can continue to view a previously-viewed main image without noticing the afterimage reduction patterns and/or the opaque areas thereof.

Moreover, it is possible to use a diverse range of afterimage reduction patterns according to a taste or preference of a user and to add a function of changing a color of opaque areas and/or semi-transparent areas of the afterimage reduction patterns, thereby increasing visual characteristics of the afterimage reduction patterns.

In addition, it is possible to solve a problem of covering an entire screen by displaying a main image that a viewer is viewing and an afterimage reduction pattern simultaneously, thereby effectively preventing afterimage.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display device capable of reducing afterimage, the device comprising:

a storage unit to store a plurality of afterimage reduction patterns having transparent areas and at least one of opaque areas and semi-transparent areas;

a composition unit to compose the afterimage reduction patterns from the storage unit with a main image provided from an external source to generate a final image and to output the final image having the afterimage reduction patterns and the main image; and a control unit to output an afterimage reduction pattern selected from among the afterimage reduction patterns stored in the storage unit, to provide the selected afterimage reduction pattern to the composition unit, and to output the final image from the composition unit to replace only pixels in the main image which correspond to the at least one of the opaque areas and semi-transparent areas in the selected afterimage reduction pattern with colors of the at least one of the opaque areas and semi-transparent areas.

2. The display device capable of reducing afterimage according to claim 1, wherein each of the stored afterimage reduction patterns has a predetermined aspect ratio, and the at least one of the opaque areas and semi-transparent areas fill a portion of the pattern less than the entire aspect ratio.

3. The display device capable of reducing afterimage according to claim 2, further comprising:

a display unit having a display area on which the final image is displayed, wherein a size of each of the stored afterimage reduction patterns is greater than or equal to a size of the display area.

4. The display device capable of reducing afterimage according to claim 3, wherein a number of afterimage reduction patterns is stored in the storage unit so that a combination of all the stored at least one of the opaque areas and semi-transparent areas is sufficient to replace at least once all of the pixels of the main image with at least one of an opaque pixel and a semi-transparent pixel.

5. The display device capable of reducing afterimage according to claim 4, wherein each of the afterimage reduction patterns has a full pattern in which the at least one of the opaque areas and semi-transparent areas are distributed evenly over an entire portion of the afterimage reduction pattern.

6. The display device capable of reducing afterimage according to claim 4, wherein each of the afterimage reduction patterns has a full pattern in which the at least one of the opaque areas and semi-transparent areas are distributed in specific areas within the afterimage reduction pattern.

7. The display device capable of reducing afterimage according to claim 2, wherein an aspect ratio of each of the stored afterimage reduction patterns is as follows:

$$\text{aspect ratio}=x:y \text{ (if } x=a \text{ then } y\neq b\text{, and if } y=b \text{ then } x\neq a)$$

where 'a' represents a width of a display area, 'b' represents a height of the display area, 'x' represents a width of the afterimage reduction pattern, and 'y' represents a height of the afterimage reduction pattern.

8. The display device capable of reducing afterimage according to claim 7, wherein the control unit controls the composition unit to compose the main image with two afterimage reduction patterns intersecting in a cruciform pattern.

9. The display device capable of reducing afterimage according to claim 3, wherein the one or more afterimage reduction patterns having the at least one of the opaque areas and more semi-transparent areas, an initial location value of each of the at least one opaque areas and semi-transparent areas, and a display time for which the opaque areas and semi-transparent areas are displayed are stored in the storage unit.

10. The display device capable of reducing afterimage according to claim 9, wherein the control unit repeatedly moves the at least one of the opaque areas and semi-transparent areas up, down, left, or right to display each of the opaque areas and semi-transparent areas at different locations, after displaying each of the opaque areas and semi-transparent areas at a location corresponding to the initial value for the display time.

11. The display device capable of reducing afterimage according to claim 6, wherein all areas of the afterimage reduction patterns are realized as at least one of the opaque areas and semi-transparent areas.

12. The display device capable of reducing afterimage according to claim 1, wherein each of the opaque areas and semi-transparent areas is a block with a size m×n, where m and n are positive integers.

13. The display device capable of reducing afterimage according to claim 1, wherein the selected afterimage reduction pattern includes at least one opaque area, and a color of the opaque areas is black.

14. The display device capable of reducing afterimage according to claim 1, wherein each of the opaque areas and semi-transparent areas is composed of bitmaps.

15. The display device capable of reducing afterimage according to claim 1, further comprising a user input unit to output a request signal to request afterimage reduction such that the control unit activates an afterimage reduction function and instructs the composition unit to output the final image when the request signal is received by the control unit.

16. The display device capable of reducing afterimage according to claim 1, wherein if a time during which the main image is statically displayed on a display unit exceeds a standard time, the control unit activates an afterimage reduction function and instructs the composition unit output the final image.

17. A display device, comprising:

a display unit to display a color image that corresponds to a received external signal during a first predetermined time;

an afterimage reduction pattern generation unit to generate a plurality of patterns to change colors in one or more areas of the displayed color image during a second predetermined time after the first predetermined time elapses;

a storage unit to store the plurality of patterns generated by the afterimage reduction pattern generation unit; and a controller to select from among the plurality of patterns stored in the storage unit to apply to the color image, wherein the controller controls the afterimage reduction pattern generation unit to generate a plurality of patterns to change colors in one or more areas if the color image is displayed without change for the first predetermined time.

18. An afterimage reduction method usable in a display device, the method comprising:

storing a plurality of afterimage reduction patterns, each having a transparent area and at least one of an opaque area and a semi-transparent area;

displaying a main image;

generating a final image by composing the main image with at least one of the afterimage reduction patterns to replace pixels in the main image with at least opaque pixels or semi-transparent pixels according to the at least one of the opaque area and semi-transparent area to reduce an afterimage; and displaying the final image.

19. The afterimage reduction method usable in a display device according to claim 18, wherein each of the afterimage reduction patterns has a predetermined aspect ratio, and the at least one of the opaque areas and semi-transparent areas fill a portion of the pattern less than the entire aspect ratio.

20. The afterimage reduction method usable in a display device according to claim 19, wherein a size of each of the afterimage reduction patterns is greater than or equal in size to a full screen area of a display unit on which the main image is displayed.

21. The afterimage reduction method usable in a display device according to claim 20, wherein the quantity of the plurality of afterimage reduction patterns is such that a combination of all the stored opaque or semi-transparent areas is sufficient to replace all the pixels of the main image at least once.

22. The afterimage reduction method usable in a display device according to claim 21, wherein each of the afterimage reduction patterns includes one of a first pattern in which the one or more opaque areas are distributed uniformly over an entire area of each pattern, and a second pattern in which the one or more opaque areas are distributed in specific areas of each pattern.

23. The afterimage reduction method usable in a display device according to claim 19, wherein the aspect ratio of each of the afterimage reduction patterns is as follows:

$$\text{aspect ratio}=x:y \text{ (where if } x=a\ y\neq b\text{, and if } y=b\ x\neq a\text{)}$$

where 'a' represents a width of a display unit on which the main image is displayed, 'b' represents a height of the display unit on which the main image is displayed, 'x' represents a width of the afterimage reduction pattern, and 'y' represents a height of the afterimage reduction pattern.

24. The afterimage reduction method usable in a display device according to claim 23, wherein the generating of the final image comprises generating two afterimage reduction patterns intersecting in a cruciform pattern and composing the two intersecting afterimage reduction patterns with the main image.

25. The afterimage reduction method usable in a display device according to claim 20, further comprising:

storing in a storage unit an initial location value of each of the at least one of the opaque areas and semi-transparent areas and a display time during which each of the at least one of the opaque areas and semi-transparent areas is displayed, wherein the generating of the final image comprises generating an afterimage reduction pattern in which each of the opaque areas is displayed at a location corresponding to the initial location value;

the displaying of the final image comprises displaying the generated afterimage reduction pattern for the set display time; and when the display time elapses, moving each of the at least one opaque areas and semi-transparent areas up, down, left, or right with respect to the initial location and regenerating the afterimage reduction pattern.

26. The afterimage reduction method usable in a display device according to claim 22, wherein all areas of the afterimage reduction pattern are composed of the opaque areas.

27. The afterimage reduction method usable in a display device according to claim 18, wherein each of the at least one of the opaque areas and semi-transparent areas is a block with a size m×n, where m and n are positive integers.

28. The afterimage reduction method usable in a display device according to claim 18, wherein a color of the opaque areas is black.

29. The afterimage reduction method usable in a display device according to claim 18, wherein the generating of the final image is performed if a request signal is received from a user interface requesting afterimage reduction.

30. The afterimage reduction method usable in a display device according to claim 18, wherein the generating of the final image is performed if a time during which the main image is displayed exceeds a preset time period.

* * * * *